(12) United States Patent
Frenne et al.

(10) Patent No.: US 8,971,434 B2
(45) Date of Patent: Mar. 3, 2015

(54) PRECODING CODEBOOK AND FEEDBACK REPRESENTATION

(75) Inventors: Mattias Frenne, Uppsala (SE); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/235,120

(22) Filed: Sep. 16, 2011

(65) Prior Publication Data
US 2012/0063494 A1 Mar. 15, 2012

Related U.S. Application Data

(63) Continuation of application No. PCT/IB2010/000980, filed on Mar. 17, 2010.

(30) Foreign Application Priority Data

Mar. 17, 2009 (CN) .................. PCT/CN2009/070850

(51) Int. Cl.
*H04B 7/02* (2006.01)
*H04L 1/02* (2006.01)
*H04B 7/04* (2006.01)
*H04B 7/06* (2006.01)

(52) U.S. Cl.
CPC ............ *H04B 7/0417* (2013.01); *H04B 7/0634* (2013.01); *H04B 7/0639* (2013.01); *H04B 7/0465* (2013.01); *H04B 7/0478* (2013.01)
USPC ............. 375/267; 375/219; 375/296; 455/69; 455/63.4; 455/101; 455/415

(58) Field of Classification Search
CPC .. H04B 7/0478; H04B 7/0456; H04B 7/0639; H04B 7/0486; H04B 7/0482
USPC ........... 375/219, 267, 296; 455/69, 63.4, 101, 455/415
See application file for complete search history.

(56) References Cited

U.S. PATENT DOCUMENTS 8,081,692 B1 * 12/2011 Zhang et al. .................. 375/260
8,107,544 B2 * 1/2012 Mondal et al. ................ 375/260
(Continued)

FOREIGN PATENT DOCUMENTS

| CN | 1838578 A | 9/2006 |
|---|---|---|
| CN | 1956430 A | 5/2007 |

(Continued)

OTHER PUBLICATIONS

Copy of Extended European Search Report issued in corresponding European Patent Application No. 10753188.1, mailed Dec. 20, 2011.
(Continued)

*Primary Examiner* — Shuwang Liu
*Assistant Examiner* — Sung Ahn
(74) *Attorney, Agent, or Firm* — Brinks Gilson & Lione

(57) ABSTRACT

The invention relates to a technical field of multiple-antenna transmission in a wireless communication system. Communication of feedback representation of and generating a codebook suitable for precoding of multiple-antenna transmission is disclosed. An example matrix representation of precoding of a first number of antenna ports comprises precoding submatrices of less antenna ports.

16 Claims, 4 Drawing Sheets

(56) References Cited

U.S. PATENT DOCUMENTS

| | | | |
|---|---|---|---|
| 2008/0080449 A1* | 4/2008 | Huang et al. | 370/342 |
| 2008/0188190 A1* | 8/2008 | Prasad et al. | 455/114.3 |
| 2008/0225962 A1* | 9/2008 | Zhou et al. | 375/260 |
| 2008/0232503 A1* | 9/2008 | Kim | 375/267 |
| 2008/0256163 A1* | 10/2008 | Clerckx et al. | 708/607 |
| 2008/0292013 A1* | 11/2008 | Varadarajan et al. | 375/260 |
| 2009/0046569 A1* | 2/2009 | Chen et al. | 370/203 |
| 2009/0296844 A1 | 12/2009 | Ihm et al. | |
| 2010/0172430 A1* | 7/2010 | Melzer et al. | 375/267 |
| 2011/0255635 A1* | 10/2011 | Lee et al. | 375/295 |

FOREIGN PATENT DOCUMENTS

| | | |
|---|---|---|
| CN | 101053193 A | 10/2007 |
| CN | 101286824 A | 10/2008 |
| CN | 101330179 A | 12/2008 |
| CN | 101330479 A | 12/2008 |
| WO | WO 2008/086239 A1 | 7/2008 |
| WO | WO 2008/147855 A1 | 12/2008 |
| WO | WO 2010/105415 A1 | 9/2010 |
| WO | WO 2010/106443 A2 | 9/2010 |

OTHER PUBLICATIONS

Varadarajan et al., "Nested Codebook Design for MIMO Precoders" Asilomar, IEEE2008.

Texas Instruments, "Precoding Codebook Design for 4 Node-B Antenna" Agenda Item 6.7.2, 3GPP TSG RAN WG1#48. St. Louis, Feb. 12-Feb. 16, 2007. R1-070730.

Written Opinion of the International Searching Authority issued in corresponding PCT Patent Application No. PCT/IB2010/000980, mailed Sep. 30, 2010.

International Search Report issued in corresponding PCT Patent Application No. PCT/IB2010/000980, mailed Sep. 30, 2010.

Written Opinion of the International Searching Authority issued in corresponding PCT Patent Application No. PCT/CN2009/070850, mailed Nov. 26, 2009, 4 pages.

Mondel et al., "Rank-Independent Codebook Design from a Quaternary Alphabet", IEEE 2007, 5 pages.

Love et al., "Limited Feedback Unitary Precoding for Spatial Multiplexing Systems", IEEE Transactions on Information Theory, vol. 51, No. 8, Aug. 2005, 10 pages.

Third Generation Partnership Project, Technical Specification Group Radio Access Network; Evolved Universal Terrestrial Radio Access (E-UTRA); Physical Channels and Modulation (Release 8), V8.6.0, Mar. 2009, 83 pages.

* cited by examiner

PRECODING CODEBOOK AND FEEDBACK REPRESENTATION

CROSS-REFERENCE TO RELATED APPLICATIONS

This application is a continuation of International Application No. PCT/IB2010/000980, filed on Mar. 17, 2010, which claims priority to International Application No. PCT/CN2009/070850, filed on Mar. 17, 2009, both of which are hereby incorporated by reference in their entireties.

TECHNICAL FIELD

The disclosure relates to a technical field of multiple-antenna transmission in a wireless communication system. Particularly, it relates to the technical field of precoding and communication of a representation of precoding feedback.

BACKGROUND

Precoding for Multiple Input Multiple Output (MIMO) communication systems is used to enhance signal gain and/or to improve receiver signal separation between multiple transmitted streams of information. Precoding is e.g. used in wireless communication standards such as 3GPP LTE, 3GPP2 UMB and IEEE 802.16e. In all these standards OFDM is used as the modulation technique for transmission.

Precoding is performed by multiplying streams or a stream, to be transmitted, by a matrix or a vector, respectively. The matrix or vector representing used precoding (also denoted precoder in the following) should match the channel for good separation of different streams, and thereby achieve a high receive Signal to Noise Ratio (SNR) for each stream. The input-output relation in a OFDM system transmitting over a wireless channel, can be described in the frequency domain as, $$y = HWx + n, \quad\quad\quad (\text{B-1})$$

where W is the precoding matrix, H the channel matrix, x is the input vector containing the symbols to be transmitted, n the vector of noise samples, and y the output signal at the receiver. The relation in equation B-1 holds for every subcarrier in the OFDM system. However, the same precoding matrix W is usually employed for a group of adjacent subcarriers.

The model in equation B-1 is applicable in a wireless communication system where a base station, having multiple transmit antennas, communicates with a receiving mobile station, and also in a wireless communication system where multiple base stations, each having multiple transmit antennas, communicate with the same receiving mobile station. In the latter case, the transmission channel H has the same number of columns and the precoding matrix W the same number of rows as the total number of transmit antennas for all cooperating base stations. This scenario is called a Cooperative Multipoint Transmission (COMP) system and a codebook for a large number of transmit antennas is thus required.

The precoding matrix W is selected based on the transmission channel H, i.e. the precoder is channel-dependent. Also, the transmission rank is selected based on the channel H. The transmission rank is equivalent to the number of transmitted streams and is equal to the number of columns of the precoding matrix W. Hence, if rank one is selected, the precoding matrix W becomes a precoding vector.

FIG. 1 shows schematically a wireless communication system where one base station is transmitting two streams precoded by a rank two precoding matrix W. In this case, the transmitting base station has four transmit antennas and the receiving mobile station has two receive antennas. At the receiver a receiver filter is used with the purpose to separate the two streams.

FIG. 2 shows schematically a scenario where three transmitting base stations in a wireless communication system, each having four transmit antennas, are transmitting three streams to a receiving mobile station equipped with three receive antennas. This is an example of a COMP transmission where multiple base stations are transmitting a coordinated signal towards a receiving mobile station. The transmission channel H has thus twelve columns and three rows in this case, since there are in total twelve transmit and three receive antennas. Further, since three streams are transmitted, the precoding matrix W has twelve rows and three columns, and is thus taken from a codebook for twelve transmitter antennas. Each base station transmits a sub-matrix of this twelve-by-three matrix W, for instance, base station transmits the three streams using a precoding matrix obtained as the top four rows and the three columns of the precoding matrix W.

The receiver thus receives y, and with knowledge of the combined channel-precoder product G=HW, the receiver can create a receiver filter R that estimates the transmitted symbol vector as, $$\hat{x} = Ry. \quad\quad\quad (\text{B-2})$$

A commonly used receiver filter is the zero forcing filter, $$R = (G^*G)^{-1}G^*, \quad\quad\quad (\text{B-3})$$

or the Linear Minimum Mean Squared Error (LMMSE) receiver filter, $$R = (G^*G + C_{nn})^{-1}G^*, \quad\quad\quad (\text{B-4})$$

where $C_{nn}$ is the noise plus interference covariance matrix at the receiver.

If information about the channel H is available at the transmitter, the corresponding precoder W is selected and used for transmission. Criteria for selecting precoder W, including its rank, could be to maximize the minimum Signal to Interference plus Noise Ratio (SINR) for the estimated symbols in Other criteria for selecting W are also known, such as maximizing the total number of transmitted information bits, taking into account all streams. Note that the column dimension of precoder W, also known as the rank of the transmission, is also part of the selection of precoder W so both a rank and a preferred precoder W within all possible precoding matrices with this rank (equivalent to number of columns) is selected.

In general, the channel H is unknown at the transmitter. If the receiver measures and feeds back the full channel information H to the transmitter, and the transmitter decides the precoding matrix W based on the obtained channel information from the receiver, a vast amount of feedback signalling is needed, which is undesirable.

In order to reduce signalling overhead, a conventional way is to construct a limited set of possible precoders $W_i$, i=1, ..., N for a given rank. A collection of these precoding matrices for a given rank is denoted as a precoding codebook. The codebook for a certain rank, or equivalently number of spatial streams, thus consists of N unique precoding matrices (or vectors if the rank is one), each of size M times R, where M is the number of transmit antenna ports and R is the number of parallel spatial streams or transmission rank, respectively.

The codebook is known and stored at both the transmitter and receiver. Since, the receiver often has better knowledge about the channel H between the transmitter and receiver, the receiver can select a rank and an optimal precoder W from the codebook of this rank based on knowledge about the channel, and then feed back an index representing the rank and the selected precoder to the transmitter. The transmitter may then use the precoder corresponding to the index fed back by receiver for a transmission; or the transmitter may have other sources of information to choose a different precoder than the one selected by the receiver. Hence, the feedback from the receiver should only be seen as a recommendation, and it is the transmitter that makes the final decision on which precoding matrix that should be used for a particular transmission. For instance, the transmitter may choose to reduce the rank of the precoder, or to interpolate the precoding matrices between successive feedback reports. This operation of using feedback information to indicate the selected precoding matrix is denoted closed loop precoding.

Alternatively, the transmitter may pseudo-randomly cycle through a set of precoders if a feedback control link is not available, which is denoted open loop precoding. To support open loop precoding, it is useful if different precoding matrices in a set of precoders only differs by a permutation of its columns or rows. Permutation of columns is equivalent to permuting the mapping of streams to the precoding matrix, and permutation of rows is equivalent to permuting the mapping of the precoding matrix to the physical antennas. This cycling of mappings will ensure that each stream encounter a channel with a variation in quality, to avoid the case that one stream always has bad channel quality, which could be the case in an open loop system. Hence, a codebook designed for open loop operation has a subset of precoding matrices which differ only by permutation of columns or rows.

In FIG. 2, a feedback operation of a wireless communication system is schematically illustrated. The receiver estimates the channels from all transmit antennas to all receive antennas using a channel estimation unit. The estimated channel is then used in a precoding matrix selection unit where the rank and precoding matrix is selected from a codebook of available precoding matrices for this rank.

The design of the codebook is a topic which has drawn a lot of attention in the recent years. It is a problem to find an optimal codebook since its performance depends on the channel models and performance metric used for the evaluation. However, a standard measure to evaluate the performance of different codebooks is the minimum pair-wise distance dmin between all precoders in the codebook. A codebook with a large dmin is considered to have a better performance than a codebook with small dmin.

Other desirable properties of a codebook relate to implementation complexity requirements. Two such properties are the constant modulus and constrained alphabet properties, which means that all matrix elements of all precoders in the codebook have the same absolute magnitude, and are taken from a finite complex valued constellation such as {+1,−1,+i,−i} or 8-PSK. The constant modulus property assures that all M power amplifiers at the transmitter are utilized equally and transmits with the same power, and the constrained alphabet property simplifies receiver computations, such as when inverting and multiplying matrices.

Another desirable property of a codebook is the nested property, which implies that a precoding matrix of rank R is a sub-matrix of a precoding matrix of rank R+1. For instance, a rank one precoding vector is a column in a rank two precoding matrix, and so on. This property simplifies decision making in the receiver regarding which rank and which precoder to select, since results from a lower rank calculation can be stored and re-used when calculating selection measures for other, either higher or lower ranks.

Furthermore, codebook restriction is a property which allows the communication system to restrict which, of all precoding matrices in the codebook and for which ranks the receiver is allowed to select in precoder selection. Thereby, the system can exclude some precoding matrices or ranks, if beneficial. For one codebook, it is difficult to make each precoder suitable for any scenario. For example, in a certain channel scenario, maybe only a subset of the precoders within a codebook are suitable for use. In this case, if codebook restriction is employed, the receiver will have a smaller precoder search space to find the best precoder, which can reduce the complexity of the receiver and to improve the performance in a particular channel scenario.

In the 3GPP LTE specification; with M=4 transmit antenna ports, there are N=16 precoders, each generated by a Householder transformation from its corresponding generating vector, defined for each rank R=1, 2, 3 and 4, respectively. Hence, N*R=64 different precoders are stored in the User Equipments (UEs) and the eNBs (base stations in LTE), respectively. If codebook restriction is employed, then the number of precoders eligible for selection can be reduced, for instance by removing all precoding matrices of the highest rank.

In the 3GPP LTE-Advanced (LTE-A) communication system, which is supposed to be an extension of the LTE system, up to eight antenna ports will be supported to further increase system performance, such as peak data rate, cell average spectrum efficiency, etc, and therefore higher order MIMO with eight antenna ports will be supported. In the LTE system, the maximum number of antenna ports available for codebook precoding is four.

SUMMARY

How to design a precoding codebook for eight antenna ports as supported in LTE-A; or to design a codebook for multiple antenna transmissions in general? How to design a codebook having one or more of the desirable properties as discussed above? Generally, when designing codebooks, it is desirable that they are easy to implement in terms of computational complexity and memory storage requirements.

In an example 3GPP LTE-A communication system, mentioned COMP transmissions will be supported. The total number of transmit antennas in a COMP system may vary depending on how many base stations are co-operating in the COMP transmission mode to a mobile station. Hence, codebooks for different number of transmit antennas are needed. For example, if two base stations, each having four antennas, are cooperating, then a codebook for eight antennas are needed. If four base stations, each having four antennas, are cooperating in COMP mode, then a codebook for sixteen transmit antennas is needed. Hence, a problem is to design codebooks for a variety of transmit antennas, and for a variety of different ranks or equivalently, number of transmit streams.

According to a prior art solution, a method for constructing a codebook for eight antenna ports is described based on mutually unbiased bases from quantum information theory. The method gives the nested property and the precoding matrices are constant modulus and have a constrained alphabet. However, Kronecker products between complex valued vectors x and matrices C are used in the codebook generation according to this method. For instance, to obtain a precoding matrix, it is necessary to perform the multiplications $x \otimes C = [x \cdot C_1 \ x \cdot C_2 \ \ldots \ x \cdot C_N]$ to create the precoding matrix, where $\cdot$ denotes element wise multiplication, and $C_j$ the j:th column of C.

According to another prior art solution, a codebook design for eight antenna ports are given using the complex Hadamard transformation, which consists of Kronecker products between complex valued matrices. The full rank eight codebook is always constructed first and to obtain the lower rank codebook, columns are removed from the full rank codebook. The codebook design consists of several design parameters and to find the final codebook, computer simulations are needed.

According to an example aspect of the present invention, one or more of the aforementioned problems are solved with a method and product of generating a first codebook A comprising at least a first precoding matrix ap of multiple antenna transmission in a wireless communication system. For a first precoding matrix ap having M' number of rows and R' number of columns and comprising at least a first and second sub-matrix; said generating comprises:

selecting at least a second bi and third bk precoding matrix belonging to a second codebook B, said second bi and third bk precoding matrices having M number of rows and R1 number of columns, where M'>M, M≥2 and R1≥1; and obtaining said first and second sub-matrices based on said second bi and third bk precoding matrices, respectively, so that the columns in said first precoding matrix ap are orthogonal to each other when R'>1.

According to another example aspect of the present invention one or more of the aforementioned problems are solved with a method of using a first codebook A as generated for precoding multiple-antenna transmission in a wireless communication system.

The claims comprise various embodiments of the invention.

An advantage with a codebook according to the present invention is that a codebook can be generated from precoders with a smaller matrix dimension than the dimension of the codebook to be generated; and also that these generated precoders are inheriting desired properties, mentioned above, from the precoders of the smaller dimension. For instance, in a UE for a LTE-A communication system only the LTE codebook needs to be stored in the memory, since the LTE-A codebook can be based on the LTE codebook according to the invention. This will lower the memory requirements of the UE. Further, no matrix products (element wise products or Kronecker products) between complex valued matrices are needed to construct an eight antenna codebook, why computational complexity is reduced.

Furthermore, example embodiments of the present invention provide large flexibility when designing codebooks of different transmission systems and scenarios, e.g. a single base station transmission, or a COMP transmission where a plurality of base stations cooperates in downlink transmission. Since a UE sometimes is connected to a single base station and sometimes to multiple base stations through COMP operation, the UE must generate and store corresponding precoding codebooks for a variety of scenarios. It is therefore beneficial if codebook generation and design for the single base station scenario and COMP scenario (and other scenarios as well) employ the same general method, since codebooks for different number of antenna ports can be obtained with low complexity, such as according to example embodiments of present invention.

Other advantages of the present invention will be apparent from the following detailed description of embodiments of the invention.

BRIEF DESCRIPTION OF THE DRAWINGS

The appended drawings are intended to clarify and explain the present invention in which.

DETAILED DESCRIPTION

Figure 1:
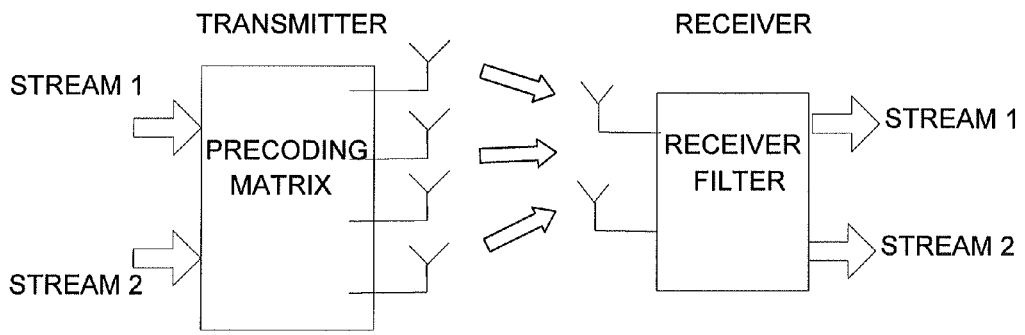
FIG. 1 schematically shows how two streams are mapped to four antennas using a precoding matrix and how a two antenna receiver adopts receiver filtering to reconstruct the two transmitted streams.
Figure 2:
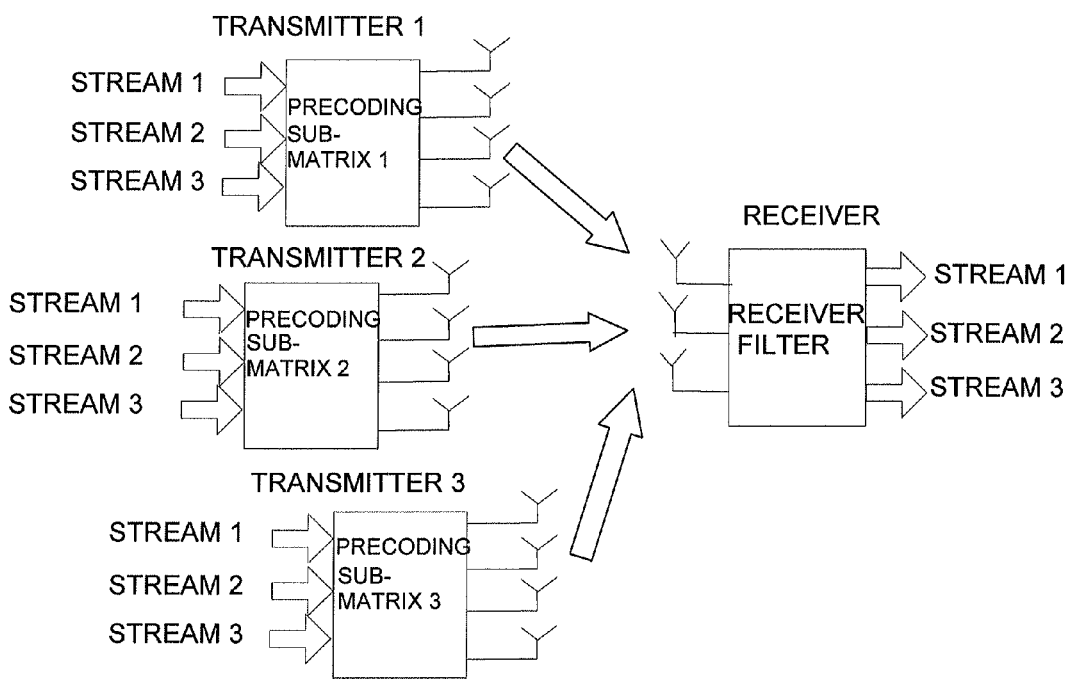
FIG. 2 schematically shows how three streams are mapped to four antennas in three base stations (transmitter 1, 2 and 3, respectively) when transmitting in COMP mode. The three base stations therefore share one precoding matrix from a codebook, and hence each base station uses a sub-matrix of the one precoding matrix as their respective precoding matrix. The figure also shows a three antenna receiver adopting receiver filtering to reconstruct the three transmitted streams.
Figure 3:
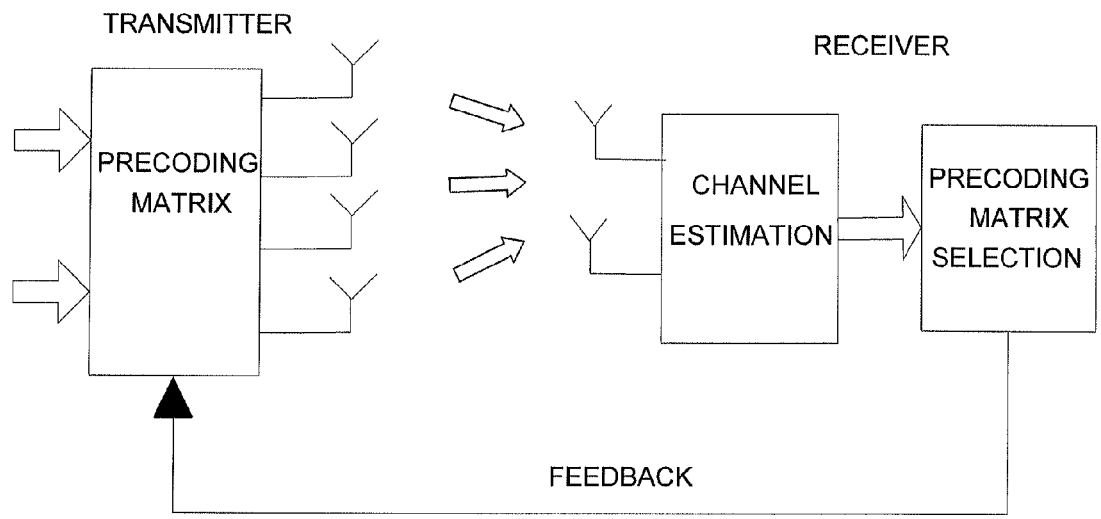
FIG. 3 schematically shows how the receiver estimates the channel between the transmitter and receiver, use the channel estimates to decide an optimal precoding matrix from a predefined codebook and feeds back an index corresponding to the preferred precoding matrix to the transmitter, which applies the precoding matrix in the subsequent transmission.

Define two codebooks, A and B, where codebook A is designed for M' transmit antenna ports and for rank R' transmission, and consists of N' number of precoding matrices $a_p$ of size M'×R' for each rank R', where $1 \le i \le N'$, $1 \le R' \le M'$, and where the columns of each $a_p$ are mutually orthogonal, $$A = \{a_1, \ldots, a_{N'}\},$$

and where codebook B for M<M' transmit antenna ports consists of N number of unitary precoding matrices $b_i$ of size M×R for rank R transmission, where $1 \le i \le N_R$, $1 \le R \le M$, $$B = \{b_1, \ldots b_N\}.$$

Further, assume that $b_i^{\{\omega\}}$ is a M×S matrix consisting of S columns in the set ω of matrix $b_i$. For example $b_i^{\{13\}}$ is a M×2 matrix consisting of column 1 and 3 of matrix $b_1$. Also, assume that codebook B has the nested property, i.e. selected columns in the precoding matrix $b_i$ of codebook B of rank R is a precoding matrix $b_j$ from the codebook B of rank R−1. Assume further that codebook B has the constant modulus and the constrained alphabet property, i.e. each element of an arbitrary matrix $b_i$ has the same magnitude and is taken from a finite signal constellation Ω.

With the notation above, a codebook for a LTE-A communication system is a codebook A with M'=8 and a codebook for a LTE communication system is codebook B with M=4 and with maximum number of precoding matrices N=16. The present invention solves at least the mentioned problems by creating the eight antenna port codebook A for a given rank R, consisting of precoding matrices with orthogonal columns, in such a way that each precoding matrix in this codebook A contains at least two sub matrices based on precoding matrices obtained from the four antenna port codebook B. The precoding matrices belonging to codebook B can be multiplied with the same or different complex matrices or scalars, and the rows or columns of the two precoding matrices can also be permuted. The two sub-matrices can be based on two different precoding matrices in codebook B, but can also be based on a single precoding matrix in codebook B.

Note that the present invention provides codebooks A for all ranks R between one and the maximum number of transmit antennas ports M' for a given wireless communication system. Also, there may be reasons to select different codebooks for rank one or two, respectively, since these ranks are also used for multi-user transmission, which is a different mode where more than one user receives information simultaneously. In other words, in this mode, the transmitted streams are intended for different users or receivers. Therefore, this mode may have special codebook design requirements, but since only the lower rank codebooks are used in this mode, the higher rank codebooks could be generated by the method according to the present invention. Hence, this invention considers methods for codebook generation for a given rank R'.

An embodiment of codebook generation according to the present invention, without permutations or multiplications, is given in equation 1, $$a_p = \begin{pmatrix} b_i \\ b_k \end{pmatrix}. \quad (1)$$

The receiver can select two suitable precoding matrices $b_i$ and $b_k$, from the set of precoding matrices belonging to codebook B, to be used for the sub-matrices in equation 1 and feed back this information to the transmitter. Since the codebook B has maximum rank four in LTE, this construction of an eight antenna port codebook A with two sub matrices works up to rank four. It should also be noted, as mentioned above, that the selected precoding matrices $b_i$ and $b_k$ may be the same precoding matrix, i.e. i=k.

The resulting codebook A constructed in this way will inherit the nested, constant modulus and constrained alphabet properties of codebook B for all transmission ranks. Any matrix operation, known to a person skilled in the art, such as: row permutation, column permutation, inversion, transpose or Hermitian transpose of the matrices of codebook A are also possible, and part of the present invention.

Furthermore, the size of codebook A is the size of codebook B squared if all combinations of $b_i$ and $b_k$ are allowed. If a smaller codebook A is desirable, precoding matrices can be removed from codebook B before constructing codebook A so that codebook A is based on a subset of the precoding matrices belonging to codebook B.

Other benefits of the present invention are that the receiver can reuse computation algorithms from codebook B, since codebook A consists of an aggregation of at least two precoding matrices from codebook B.

According to another embodiment of the invention, each precoding matrix from the smaller codebook B can be multiplied with a complex scalar. These scalars can be denoted as $\beta_i$ and $\beta_k$, and an example of this embodiment with scalar multiplication is shown in equation 2, $$a_p = \begin{pmatrix} \beta_i b_i \\ \beta_k b_k \end{pmatrix}. \quad (2)$$

In another embodiment, a precoding matrix $a_p$ of lower rank is obtained by removing columns from the two sub matrices in equation 2. For instance, a rank two precoding matrix can be obtained as shown in equation 3, $$a_p = \begin{pmatrix} \beta_i b_i^{\{13\}} \\ \beta_k b_k^{\{12\}} \end{pmatrix}, \quad (3)$$

where column one and three are used from the upper precoding matrix (having index i) and columns one and two from the lower precoding matrix (having index k). The selection of columns to be removed may be dependent on the precoding matrix selected, i.e. depending on the indices i and k in equation 3.

According to yet another embodiment of the invention, each precoding matrix from the smaller codebook B can be multiplied with a complex matrix. These matrices, which may be diagonal matrices, can be denoted as $\Gamma_i$ and $\Gamma_k$, and an example of this embodiment with scalar multiplication is shown in equation 4, $$a_p = \begin{pmatrix} \Gamma_i b_i \\ \Gamma_k b_k \end{pmatrix}. \quad (4)$$

And a different embodiment is shown in equation 5.

$$a_p = \begin{pmatrix} b_i \Gamma_i \\ b_k \Gamma_k \end{pmatrix}. \quad (5)$$

For generation of a codebook A with rank higher than four we need to extend the precoding matrices of codebook A to more than four columns. According to one embodiment of the invention at least four precoding matrices from codebook B are used as four sub matrices in one precoding matrix $a_p$ in codebook A, i.e. the precoding matrix $a_o$ in codebook A includes precoding matrices from codebook B as shown in equation 6, $$a_p = \begin{pmatrix} \beta_i b_i & \beta_j b_j \\ \beta_m b_m & \beta_n b_n \end{pmatrix}. \quad (6)$$

Since $a_p$ have orthogonal columns, some restrictions on the choices of indices i, j, m and n is required. In the following other embodiments of the present invention of constructing codebooks A with rank higher than 4 based on the general design in equation 6 are presented.

Yet other embodiments are shown in equations 7 and 8, $$a_p = \begin{pmatrix} \Gamma_i b_i & \Gamma_j b_j \\ \Gamma_m b_m & \Gamma_n b_n \end{pmatrix}, \quad (7)$$

-continued $$a_p = \begin{pmatrix} b_i \Gamma_i & b_j \Gamma_j \\ b_m \Gamma_m & b_n \Gamma_n \end{pmatrix} \quad (8)$$

Where the four submatrices have been multiplied from left and right with matrices $\Gamma_i, \Gamma_j, \Gamma_n$, respectively. These matrices may be diagonal matrices.

To save feedback overhead compared to the design in equations 6-8 and to take into account the fact that the columns of $a_p$ are orthogonal, the precoding matrices for a rank eight codebook A is composed of only two precoding matrices from codebook B for rank four, but where the columns have been made orthogonal by multiplying the bottom right matrix with the scalar −1, i.e. for this sub matrix the scalar is $\beta = -1$, which is shown in equation 9 below, $$a_p = \begin{pmatrix} b_i & b_i \\ b_k & -b_k \end{pmatrix}. \quad (9)$$

With this construction, only two matrices need to be indexed and the feedback from the receiver is halved compared to the design in equation 6.

The overhead with the design in equation 9 can be further reduced by selecting a single precoding matrix from the four antenna port codebook B, and applying the scalar $\beta = -1$ multiplication on one of the sub matrices in equation 6. The precoding matrix for rank eight in codebook A will therefore be composed of only one precoding matrix from codebook B. Equation 10 shows this embodiment, $$a_p = \begin{pmatrix} b_i & b_i \\ b_i & -b_i \end{pmatrix}. \quad (10)$$

According to the embodiments above, the full rank eight precoders in codebook A are generated, and to form lower rank precoders, columns needs to be removed from the full rank precoder in such way that the nested property is maintained. One way to remove columns from the rank eight codebook, is to remove columns from the right and keep the left half of the matrix intact, which is shown in equation 11 for the rank six case, $$a_p = \begin{pmatrix} b_i & b_i^{\{12\}} \\ b_k & -b_k^{\{12\}} \end{pmatrix}. \quad (11)$$

In the embodiment in equation 11, the left four columns are unchanged for all ranks above four. Another alternative is to remove columns from the right in each sub-matrix, as shown in equation 12, $$a_p = \begin{pmatrix} b_i^{\{123\}} & b_i^{\{123\}} \\ b_k^{\{123\}} & -b_k^{\{123\}} \end{pmatrix}. \quad (12)$$

A third alternative to reduce the rank and at the same time maintain the nested property is to follow the column removal according to the LTE codebook B. For instance, in LTE, the rank four precoding matrix uses all columns {1234} of the precoding matrix. The rank three precoding matrix for a given precoding matrix index may select columns {124} from the rank four precoding matrix, and may select columns {123} for another index. To obtain a rank seven precoding matrix, the third column could be removed in a first precoding matrix and the fourth column in a second precoding matrix. An example of this case is shown in equation 13, $$a_p = \begin{pmatrix} b_i & b_i^{\{124\}} \\ b_k & -b_k^{\{123\}} \end{pmatrix}. \quad (13)$$

In yet another embodiment of the present invention a four bit rank one codebook for LTE-A from a four bit rank one codebook for LTE is obtained. The LTE rank one codebook is given by, $$\tilde{B} = \{b_1^{\{1\}}, \ldots, b_N^{\{1\}}\}, \quad (14)$$

and four precoding vectors from the codebook in (14) are selected according to a predefined selection rule, for example by selecting vectors 1, 2, 3 and 4 such that, $$\tilde{B} = \{b_{1\{1\}}, b_2^{\{1\}}, b_3^{\{1\}}, b_4^{\{1\}}\}, \quad (15)$$

The 16-element LTE-A rank one codebook is then obtained by stacking codebook vectors from all possible pair wise combinations of the codebook $\tilde{B}$ as, $$A = \left\{ \begin{bmatrix} b_1^{\{1\}} \\ b_1^{\{1\}} \end{bmatrix} \begin{bmatrix} b_1^{\{1\}} \\ b_2^{\{1\}} \end{bmatrix} \cdots \begin{bmatrix} b_4^{\{1\}} \\ b_4^{\{1\}} \end{bmatrix} \right\}. \quad (16)$$

It should be noted that to obtain the LTE-A codebook according to this embodiment, it will not be necessary to first generate the rank eight codebook, and then to remove columns.

In yet another embodiment of the invention, a four bit rank two codebook for LTE-A from a four bit rank two codebook for LTE is obtained. The LTE rank two codebook is given by, $$B = \{b_1^{\{14\}}, \ldots, b_N^{\{12\}}\}, \quad (17)$$

Four precoding matrices from the codebook in equation 17 are selected according to some predefined selection rule, in this example precoding matrices 1, 2, 3 and 4 are selected such that, $$\tilde{B} = \{b_1^{\{14\}}, b_2^{\{12\}}, b_3^{\{13\}}, b_4^{\{12\}}\}. \quad (18)$$

The 16-element LTE-A codebook is then obtained by stacking codebook matrices from all possible pair wise combinations of the codebook B such that, $$A_1 = \left\{ \begin{bmatrix} b_1^{(14)} \\ b_1^{(14)} \end{bmatrix} \begin{bmatrix} b_1^{(14)} \\ b_2^{(12)} \end{bmatrix} \cdots \begin{bmatrix} b_4^{(12)} \\ b_4^{(12)} \end{bmatrix} \right\}. \quad (19)$$

It should also be noted that to obtain a LTE-A codebook according to this embodiment, it will not be necessary to first generate the rank 8 codebook and then remove columns.

In yet another embodiment of the present invention an eight bit rank sixteen codebook for a system with sixteen transmit antennas is obtained from a two bit rank four codebook for a system of four antennas. A system with sixteen transmit antennas can e.g. appear in a COMP transmission where four base stations, each having four transmit antennas, are cooperating in a transmission towards the same receiver. The codebook B for four antennas is given by $$B=\{b_1,\ldots,b_4\} \qquad (20)$$

and the codebook A for sixteen transmit antennas is obtained according to equation 21, $$a_p = \begin{pmatrix} b_a & b_a & b_a & -b_a \\ b_c & b_c & -b_c & b_c \\ b_d & -b_d & b_d & -b_d \\ b_f & -b_f & -b_f & b_f \end{pmatrix}, \qquad (21)$$

where the precoding matrices $b_a$, $b_c$, $bd_d$, $b_f$ are selected from codebook B. It is understood by the skilled person that this precoding matrix has orthogonal columns. It should be understood that if ranks lower than sixteen is desired for the generated precoding matrix, columns can be removed. It is also understood that precoders with higher dimension can be generated with the method according to the present invention, and that the present invention is a general method for generating codebooks within the scope of the appended claims.

Performance Results

To evaluate the performance of codebooks generated according to the present invention, simulations have been performed in a 5 MHz OFDM wireless communication system resembling the LTE-Advanced communication system with eight antenna ports for transmission at the base station and eight receiver antennas at the UE. For each group consisting of 24 subcarriers, a precoder was selected from a codebook of 16 precoders. The selection was performed by maximizing the sum capacity over the streams where the number of streams equals the rank of the precoding matrix.

A Typical Urban channel was assumed and each of the channel elements in the 8×8 MIMO matrix was assumed to be independently fading. The average receive SNR per receive antenna was 10 dB, and a LMMSE receiver was used.

In the performance analysis, the 16 element codebook according to the present invention was generated by selecting the first four precoding matrices of a given rank from the LTE codebook, and creating the eight antenna port codebook by selecting two precoding matrices and use equation 19 to compare its performance to a codebook with 16 precoding matrices/vectors per rank according to a prior art solution. An exception to the mentioned setup was the rank eight case where a codebook with four precoding matrices were used for the purpose of enabling to compare with the prior art solution (where only four matrices were used for rank eight).

Figure 4:
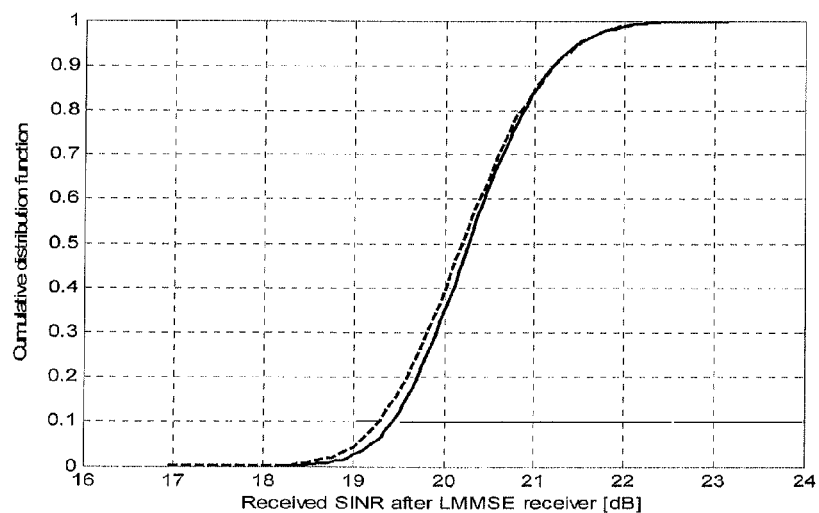
FIG. 4 shows simulation results comparing performance for a rank one codebook according to prior art with performance for a codebook according to the present invention, as the received SINR distribution after an LMMSE receiver.
Figure 5:
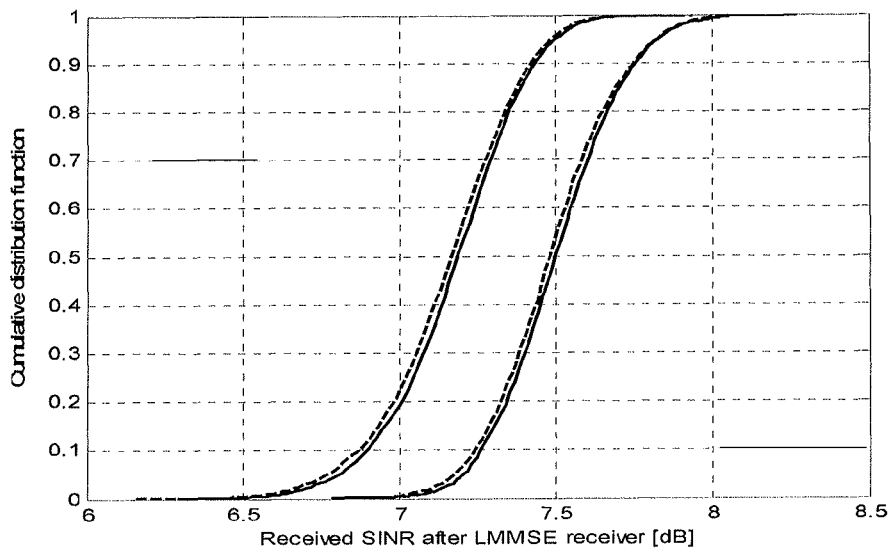
FIG. 5 shows simulation results comparing performance for a rank two codebook according to prior art with performance for a codebook according to the present invention, as the received SINR distribution after an LMMSE receiver.
Figure 6:
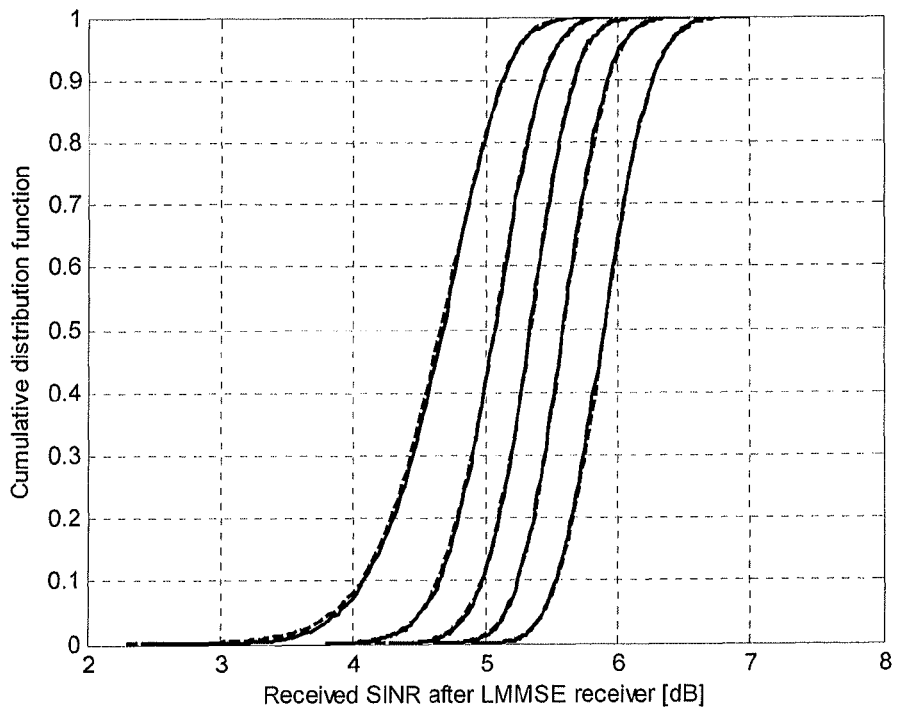
FIG. 6 shows simulation results comparing performance for a rank five codebook according to prior art with performance for a codebook according to the present invention, as the received SINR distribution after an LMMSE receiver.
Figure 7:
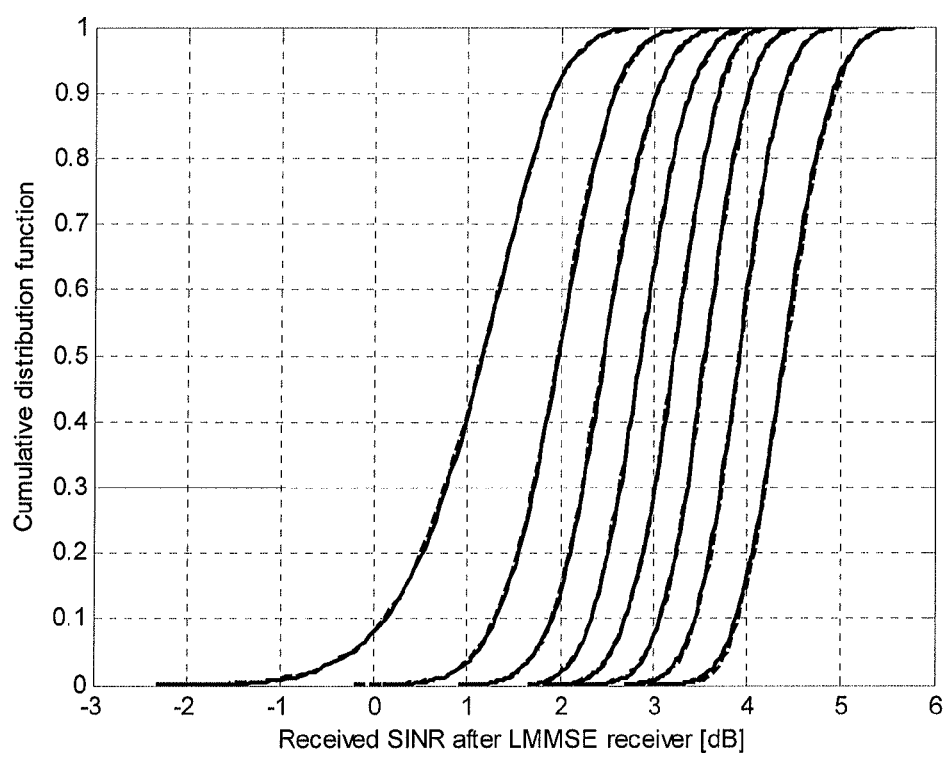
FIG. 7 shows simulation results comparing performance for a rank eight codebook according to prior art with performance for a codebook according to the present invention, as the received SINR distribution after an LMMSE receiver.

In FIGS. 4-7, the dashed lines represent the performance for codebooks according to the invention while the solid lines represents the performance for codebooks according to prior art. It can be seen from these figures that the difference is negligible in performance between the two groups of codebooks. Hence, with a codebook according to the present invention, the same performance can be obtained as for codebooks according to prior art, but the present innovation provides, as one of its benefits, a much simpler method for generation of codebooks, which avoids Kronecker multiplication of complex valued matrices. It is thus more attractive from an implementation point of view. Other advantages with the present invention have been described in this disclosure.

Furthermore, as also understood by the person skilled in the art, a method for generating a codebook, and for using the codebook generated according to the present invention may be implemented in a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The invention claimed is:

1. A method of generating a first codebook A for M' transmit antenna ports, of multiple-antenna communication in a wireless communication system, comprising at least a first precoding matrix $a_p$, said first precoding matrix $a_p$ having M' rows and R' columns, where M' and R' are natural numbers and comprising at least a first and second sub-matrix having M rows and $R_1$ columns, wherein a first sub-matrix is located at rows m=1 . . . M and columns r=1,2, . . . $R_1$ of a first precoding matrix $a_p$, and a second sub-matrix is located at rows m=M+1, M+2, . . . 2×M and columns r=1,2, . . . $R_1$ of a first precoding matrix $a_p$; comprising:

selecting, by a device in the wireless communication system, at least a second $b_i$ and third $b_k$ precoding matrix belonging to a second codebook B for M transmit antenna ports, wherein said second $b_i$ and third $b_k$ precoding matrices having M rows and $R_1$ columns are same or different precoding matrix from codebook B, where M and $R_1$ are natural numbers and M'=2*M, M≥2 and $R_1$≥1; and obtaining, by the device in the wireless communication system, said first and second sub-matrices based on said second $b_i$ and third $b_k$ precoding matrices, respectively, so that the columns in said first precoding matrix $a_p$ are orthogonal to each other when R'>1;

wherein at least one of said second and third precoding matrices is multiplied by a complex scalar or matrix in the process of obtaining said first and second sub-matrices;

wherein the device comprises a hardware processor.

2. The method according to claim 1, comprising permuting the rows or the columns of at least one of said second and third precoding matrices.

3. The method according to claim 1, comprising removing columns from at least two of said second and third precoding matrices so as to obtain R' columns of the resulting at least one matrix.

4. The method according to claims 1, comprising:
   permuting the columns of said first precoding matrix $a_p$; and/or
   permuting the rows of said first precoding matrix $a_p$.

5. The method according to claim 1, wherein said first precoding matrix $a_p$ comprises a third and fourth sub-matrix based on a fourth $b_j$ and fifth $b_m$ precoding matrix, respectively, where said $b_j$ and $b_m$ having M rows and $R_2$ columns, M and $R_2$ are natural numbers, and said third sub-matrix is located at rows m=1 . . . M and columns r=$R_1$+1, $R_1$+2, . . . $R_1$+$R_2$ of a first precoding matrix $a_p$, and said fourth sub-matrix is located at rows m=M+1, M+2, . . . 2×M and columns r=$R_1$+1, $R_1$+2, . . . $R_1$+$R_2$ of a first precoding matrix $a_p$; wherein at least one of said fourth and fifth precoding matrices is multiplied by a complex scalar or matrix in the process of obtaining said third and fourth sub-matrices; said fourth $b_j$ and fifth $b_m$ precoding matrices belonging to said second codebook B, wherein said third $b_j$ and fourth $b_k$ precoding matrices are same or different precoding matrix.

6. The Method according to claim 5, comprising at least one of the following:
   permuting the columns of at least one of said second $b_i$, third $b_k$, fourth $b_j$ and fifth $b_m$ precoding matrices;

permuting the rows of at least one of said second $b_i$, third $b_k$, fourth $b_j$ and fifth $b_m$ precoding matrices;

permuting the columns of said first precoding matrix $a_p$; and permuting the rows of said first precoding matrix $a_p$.

7. The method according to claim 6, wherein R'=R1+R2.

8. The method according to claim 7, wherein said first precoding matrix $a_p$ has the structure:

$$a_p = \begin{pmatrix} b_i & b_j \\ b_k & -b_m \end{pmatrix}.$$

9. The method according to claim 7, wherein i=j and k=m so that said first precoding matrix $a_p$ has the structure:

$$a_p = \begin{pmatrix} b_i & b_i \\ b_k & -b_k \end{pmatrix}.$$

10. The method according to claim 1, wherein $R'=R_1$.

11. The method according to claim 1, wherein said second codebook B is a codebook used in a Long Term Evolution, LTE, communication system.

12. The method according to claim 1, wherein said second codebook B is a reduced codebook of a codebook used in the Long Term Evolution, LTE, communication system obtained by selecting a subset of the precoding matrices in the codebook for the Long Term Evolution, LTE, communication system.

13. The method according to claim 1, wherein said wireless communication system is a Long Term Evolution Advanced, LTE-A, communication system, and said codebook A is used in a base station, mobile station and/or relay station.

14. An user equipment (UE) for of generating a first codebook A for M' transmit antenna ports, of multiple-antenna communication in a wireless communication, comprising at least a first precoding matrix $a_p$ of multiple-antenna transmission in a wireless communication system, said first precoding matrix $a_p$ having M' number of rows and R' number of columns and comprising at least a first and second sub-matrix having M rows and $R_1$ columns, wherein a first sub-matrix is located at rows m=1 . . . M and columns r=1,2, . . . $R_1$ of a first precoding matrix $a_p$, and a second sub-matrix is located at rows m=M+1, M+2, . . . 2+M and columns r=1,2, . . . $R_1$ of a first precoding matrix $a_p$; said user equipment (UE) comprises a processor:

configured to select at least a second $b_i$ and third $b_k$ precoding matrix belonging to a second codebook B for M transmit antenna ports, wherein said second $b_i$ and third $b_k$ precoding matrices having M rows and R of columns are same or different precoding matrix from codebook B, where M'=2*M, M>=2 and R >=1; and configured to obtain said first and second sub-matrices based on said second $b_i$ and third $b_k$ precoding matrices, respectively, so that the columns in said first precoding matrix $a_p$ are orthogonal to each other when R'>1;

wherein at least one of said second and third precoding matrices is multiplied by a complex scalar or matrix in the process of obtaining said first and second sub-matrices;

wherein said user equipment (UE) further comprises:

a receiver that receives the representation of precoding feedback, and a transmitter that transmits precoded data over multiple antennas.

15. The user equipment (UE) according to claim 14 comprising a non-transitory computer readable medium having thereon a computer program code, said non-transitory computer readable medium comprising at least one media from the group:

ROM, Read-Only Memory,
PROM, Programmable ROM,
EPROM, Erasable PROM,
Flash memory,
EEPROM, Electrically EPROM, and
hard disk drive.

16. A non-transitory computer readable medium comprising code that generates a first codebook A, for M' transmit antenna ports, of multiple-antenna communication in a wireless communication system, comprising at least a first precoding matrix $a_p$, said first precoding matrix $a_p$ having M' rows and R' columns, where M' and R' are natural numbers and comprising at least a first and second sub-matrix having M rows and $R_1$ columns, wherein a first sub-matrix is located at rows m=1 . . . M and columns r=1,2, . . . $R_1$ of a first precoding matrix $a_p$, and a second sub-matrix is located at rows m=M+1, M+2, . . . 2×M and columns r=1,2, . . . $R_1$ of a first precoding matrix $a_p$; the code:

selecting at least a second $b_i$ and third $b_k$ precoding matrix belonging to a second codebook B for M transmit antenna ports, wherein said second $b_i$ and third $b_k$ precoding matrices having M rows and $R_1$ columns are same or different precoding matrix from codebook B, where M and $R_1$ are natural numbers and M' =2*M, M≥2 and $R_1$ ≥1; and obtaining said first and second sub-matrices based on said second $b_i$ and third $b_k$ precoding matrices, respectively, so that the columns in said first precoding matrix $a_p$ are orthogonal to each other when R'>1;

wherein at least one of said second and third precoding matrices is multiplied by a complex scalar or matrix in the process of obtaining said first and second sub-matrices.

* * * * *